United States Patent Office 3,077,439
Patented Feb. 12, 1963

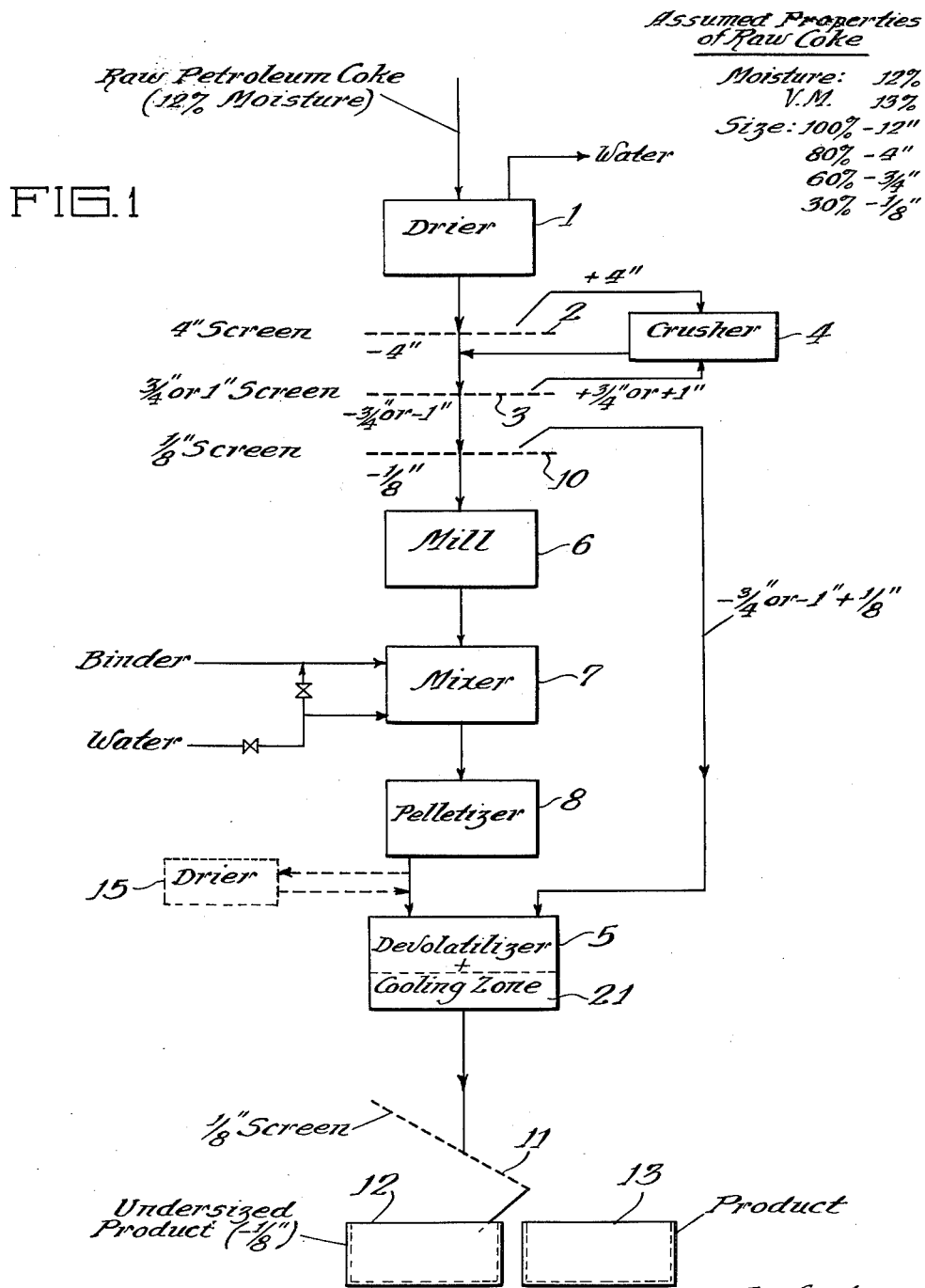

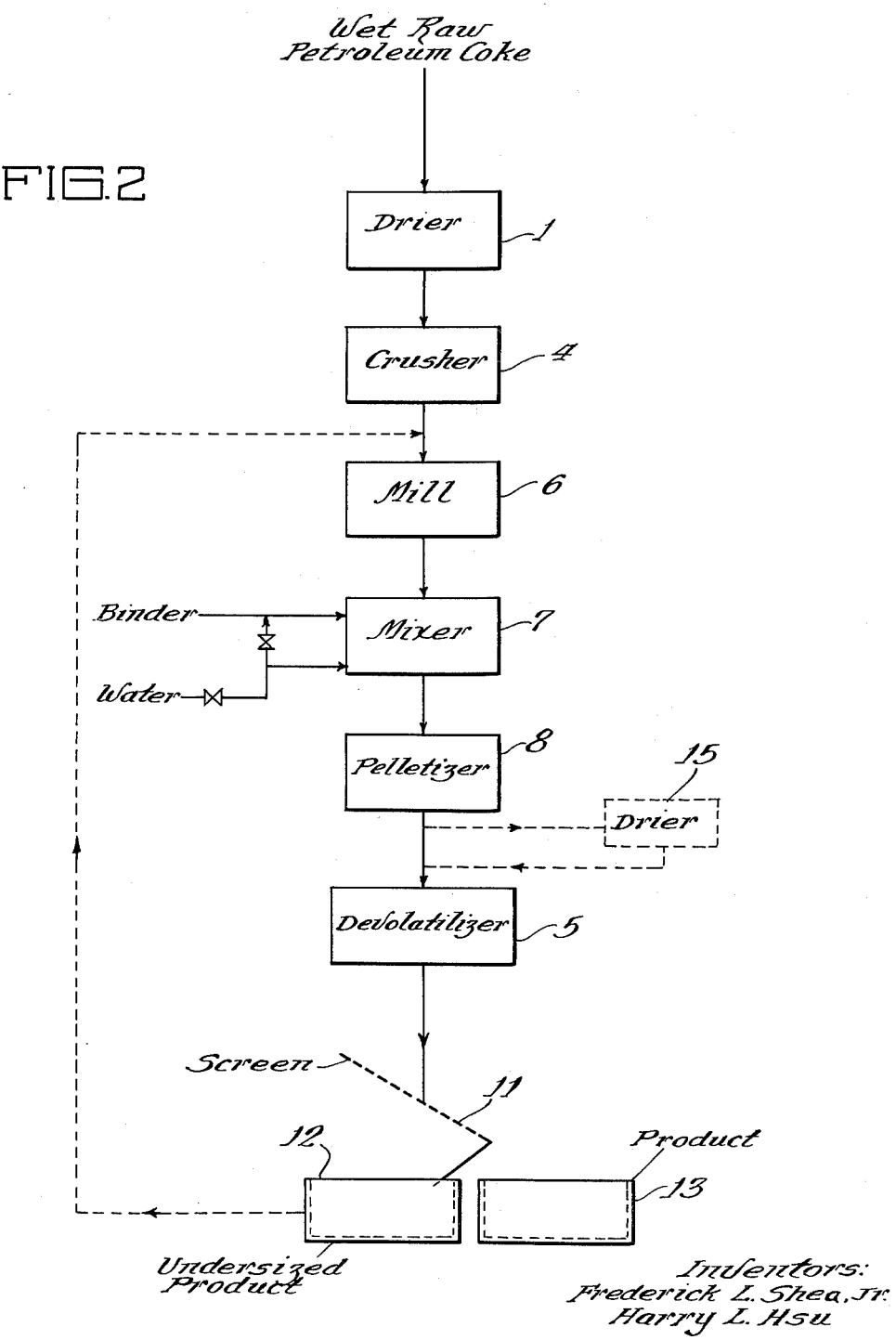

3,077,439
PROCESSING OF RAW PETROLEUM COKE
Frederick L. Shea, Jr., Arlington Heights, and Harry L. Hsu, Evanston, Ill., assignors to Great Lakes Carbon Corporation, New York, N.Y., a corporation of Delaware
Filed Nov. 3, 1960, Ser. No. 67,031
14 Claims. (Cl. 202—26)

This invention relates generally to a process for the manufacture of granular carbon pellets or bodies from raw petroleum coke. This invention relates most specifically to a method whereby run-of-pile raw petroleum coke, derived by decoking of coke chambers from a delayed coking operation by either hydraulic or mechanical means, can be conveniently, efficiently and economically processed to give a maximum yield of granular carbon which will be eminently suitable for use in process industries such as the phosphorous industry and/or the calcium carbide industry which employ carbon as a reactant or reductant, or in the production of Soderberg pastes for the aluminum industry.

The suitability of granular carbon for any particular application is dependent upon the proposed end use for the carbon and involves several factors such as particle size, freedom from impurities, reactivity, volatile matter content, electrical resistivity, hardness, cost and other factors.

It is an object of this invention to produce granular carbon suitable for use in the three industries mentioned above as well as for other similar uses.

It is another object of this invention to provide a process whereby several of the properties of the granular carbon being produced may be controlled, depending upon the proposed end use for the carbon.

It is an additional object of this invention to produce such granular carbon from a starting material comprised largely or entirely of raw petroleum coke having a volatile content between about 9 and about 20 percent.

It is an additional object of this invention to produce such granular carbon from run-of-pile raw petroleum coke, or alternatively from any raw petroleum coke starting material which has a volatile content between about 9 and about 20 percent.

It is an additional object of this invention to accomplish the foregoing in an economical, convenient and efficient manner.

It has been found that these and other objects may be achieved by carrying out the processes of this invention.

In general, the processes of this invention consist in producing a granular carbon product from a starting material comprised largely or entirely of raw petroleum coke. This product will typically be made up mostly of particles or granules or pellets larger than ⅛ inch in diameter and will have a volatile matter content less than about 6% and preferably between about 0% and about 4%. The particles of the product will typically vary in size between about ⅛" or alternatively ¼" and about ¾" or 1" in diameter and can be used alone or in conjunction with other materials in process industries such as previously described.

All or a very high percentage of the raw petroleum coke starting material will have a volatile matter (exclusive of moisture) content between about 9% and about 20%. Part or all of this starting material may be finer than ⅛" or ¼" or all or part may be larger than ¾" or 1", the processing steps of this invention permitting the use of starting materials of any size. Generally, however, the processes of this invention will be carried out on run-of-pile raw petroleum coke. Typically such a starting material may possess about 12% moisture, about 13% volatile matter (exclusive of moisture) and be of such a size that one hundred percent of it is smaller than 12 inches in diameter, about eighty percent is smaller than 4 inches, about sixty percent is smaller than ¾ inch and about thirty percent is smaller than ⅛ inch.

With such a typical starting material the general process comprises first sending the starting material through a drier where most or all of its moisture is removed, and then sending the thus dried starting material to a system of classifying screens. Of course if the starting material happens to contain little or no moisture, this initial drying step may be omitted but this generally will not be the case. Generally at least three differently meshed screens will be required or employed, but if most or all of the starting material is finer than ¾ or 1 inch, then a screen or screens having openings larger than ¾ or 1 inch will not be required.

For producing carbon granules for the calcium carbide industry a combination of 3 screens having openings of 4 inches, ¾ or 1 inch and ⅛ inch are preferred. The preferred screens for the phosphorous industry are the same with respect to the larger two but in most cases a ¼ inch screen will replace the ⅛ inch screen. In either case particles larger than 4 inches in diameter are routed through a crusher to reduce their size and these comminuted particles are then merged with the particles which pass through the 4 inch screen. Particles coarser than ¾ or 1 inch in diameter (depending upon the maximum particle size desired) and finer than 4 inches are also sent to a crusher to reduce their diameter below ¾ or 1 inch. The particles passing through the ¾ or 1 inch screen are then further classified by means of a ⅛ inch screen for producing carbon granules or bodies for the carbide industry or, generally, a ¼ inch screen for producing granules for the phosphorous industry. In the former case particles of a size −¾" or −1" and +⅛" may then be sent immediately to a devolatilizer, while in the latter case particles of a size −¾" or −1" and +¼" may then be sent immediately to a devolatilizer. The remaining particles in either case (those finer than ⅛ inch or ¼ inch) are cycled to a mill or other suitable apparatus where they are reduced to a fineness found suitable and necessary for making pellets such that at least about 40% and preferably at least about 50% of the comminuted particles pass through a 100 mesh screen. It is preferred also that the comminuted particles be of a size such that about 70% pass thru a 28 mesh screen and 100% thru an 8 mesh screen. In some cases the presence of small percentages of particles between ¼" and ⅛" may be acceptable. These reduced-in-size particles are then mixed with a suitable binder, preferably a starch-water solution, and are then agglomerated into pellets having diameters between about ⅛" and about ¾" or 1" for the calcium carbide industry or, in most cases, between about ¼" and about ¾" or 1" for the phosphorous industry. Analogous procedural steps may be followed in producing granular carbon pellets for the aluminum industry or for other uses, depending upon the size product desired.

After this the pellets are dried and then devolatilized in a devolatilizer, which may be of the same type, or the same one, to which the unpelletized, but properly dimensioned, petroleum coke particles were sent. In some instances the drying of the pellets will be carried out in a devolatilizer of suitable design while in others a separate drier will be employed. These pellets and particles are kept in the devolatilizer or devolatilizers for lengths of time and at temperatures which affect many of their properties and which typically reduce their volatile content to between about 0% and about 6% after which they are cooled and discharged into suitable containers ready for shipment.

Rather than screen out unpelletized raw petroleum coke particles of the proper size and devolatilize these, a process modification of the invention comprises reducing all of the starting material to a fineness suitable for making pellets so that nothing but pellets are processed in the devolatilizer.

The process and various additional details and modifications thereof will become clearer from a consideration of the attached drawings.

FIGURE 1 illustrates a flow sheet of the general process.

FIGURE 2 shows a flow sheet of the process modification wherein all of the raw petroleum coke starting material is reduced to a fineness suitable for making pellets.

In the process shown in FIGURE 1 the starting material having the properties set forth in the top right-hand corner of the figure, which properties are fairly representative of most of the raw petroleum cokes to be processed in accordance with the teachings of this invention, is cycled to a drier 1, such as a rotary drier at a temperature of about 210° F., to rid the starting material of most or all of its moisture, so that the coke particles no longer stick together and can be screened. Then the thus dried raw petroleum coke is cycled to a 4 inch screen 2 and is then sent to a ¾ or 1 inch screen 3. Particles larger than 4″ in diameter are sent to a crusher 4 to be reduced to a size below 4″. Particles from the drier smaller than 4″ in diameter and larger than ¾″ or 1″ are also sent to a crusher 4 to be reduced in size below ¾″ or 1″. Particles from crusher 4 larger than ¾″ or 1″ are recycled to the crusher. All of the particles of the starting material are thus screened through the ¾″ or 1″ screen 3 onto a ⅛″ screen 10. Those particles passing through the ¾″ or 1″ screen but larger than ⅛″ in diameter (—¾″ or —1″+⅛″) are, or may be, immediately cycled to a devolatilizer 5 and after heat treatment, through a cooling zone 21.

Those particles passing through the ⅛″ screen 10 are cycled through a mill 6, such as a hammermill, wherein they are reduced in size to a fineness such that approximately 50% pass through a 100 mesh screen. The thus milled particles are thoroughly mixed with an aqueous binder mixture or solution, such as of starch and water, in mixer 7 and are then cycled to an agglomerating means such as pelletizer 8, preferably of the disc type, which forms the particles into agglomerates or pellets which may be varied widely in size but preferably between about ⅛″ and about ¾″ or 1″ in diameter. These pellets are then cycled into a devolatilizer 5, or a separate devolatilizer from the one to which the unpelletized raw petroleum coke particles of the proper size were sent, for suitable heat treatment. As indicated by the dotted lines, the pellets may sometimes be sent to a separate drier 15 to be dried before being sent to a devolatilizer, or they may be dried in the devolatilizer. The heat treated particles and pellets or agglomerates, after being devolatilized to a point where their volatile content is between about 0% and about 6%, are then cooled. The cooling may be carried out in a cooling zone 21 which may comprise the base portion of the devolatilizer or it may be carried out partially therein and the rest outside of same, or it may substantially all be carried out separate from the devolatilizing unit.

In the processes of the present invention a small percentage of undersized (such for example as —⅛″ or —¼″ as the case may be) product may be obtained due mainly to particle abrasion in the devolatilizer and cooling zone. It is therefore sometimes desirable to separate this small percentage of undersized particles from the main product having the proper particle sizes. This step is shown in FIGURES 1 and 2 wherein a screen 11 is employed to separate the undersized particles 12 from the properly sized particles of the product 13. A ⅛″ screen is employed in the process of FIGURE 1. It will be appreciated that a ¼″ screen will be employed when the product size desired is —¼″ and that also in many cases the product specifications will not require the use of any screen at this stage of the process.

FIGURE 2 shows a modified process, which is particularly adaptable to cases where the raw petroleum coke starting material is low in percentages of particles between ⅛″ and ¾″ or 1″, such as where the starting material is made up largely of finer particles. In this modified process, rather than employ a screening operation, all of the particles are sent through a drier, then crushed, milled, mixed with an aqueous binder material and formed into pellets. No unpelletized particles are devolatilized as in the process of FIGURE 1. The pellets coming from the forming means or pelletizer 8 may be sent immediately to a devolatilizer 5 or may be sent to a separate drier 15 to rid the pellets of most or all of their moisture.

Several of the steps or devices employed in the processes of FIGURES 1 and 2 are the same and where this is the case they are identically numbered.

As with the process of FIGURE 1, during the course of the devolatilization step a small percentage of the materials being treated may become abraded or cracked, reducing their size below the minimum desired. If it becomes necessary or desirable to separate these undersized particles from the main product 13 this may conveniently be accomplished by placing a screen product chute 11 at the exit of the cooling zone. The size openings of this screen will of course be the same as the minimum diameter of the product desired or ⅛″ in the case of granules produced for the carbide industry and generally ¼″ in the case of granules produced for the phosphorous industry.

The undersized product 12 in the process of either figure will not usually comprise more than a small percentage of the devolatilized product. It is an additional finding of this invention however that even these small amounts of undersized product may be utilized or integrated into the main process by adding them to the raw petroleum coke particles entering mill 6 or mixer 7 in amounts up to about 4 parts per 100 parts of raw petroleum coke. When so recycled in these amounts the undersized devolatilized product can be successfully incorporated into the subsequent steps of the process without impairing or detracting from the pelletizing or devolatilizing procedures. The preferred alternative for accomplishing this is to add these particles to the materials going into the mill, as shown by the dotted lines in the process of FIGURE 2. This modification is of course equally applicable to the process of FIGURE 1.

The devolatilization step may be carried out in several types of devolatilizers. Typical temperatures found preferable for carrying out the devolatilization of the pellets or properly sized particles are in the region of about 1650° F. although temperatures as high as 2000° F. or as low as about 900° F. may be employed. Either reducing or inert devolatilizing atmospheres (substantially non-oxidizing) are necessary in the heating step of the pellets, or mixtures of pellets and unpelletized carbon granules, in order to prevent or minimize any oxidation of the carbonaceous solids being processed. This condition can be readily provided by burning a fuel in air or oxygen, the fuel being present in excess. Any oxidation should be kept to a minimum for even very mild oxidation can result in weak pellets. The maintenance of these conditions is most critical below about 550° C. which is near the point at which the bond of the pellets becomes permanently "set." A possible procedural alternative is to devolatilize the unpelletized carbon granules separately from the pellets. In this case the atmosphere control in devolatilizing is not as critical with respect to the presence of oxygen as required in devolatilizing the pellets or mixtures of pellets and unpelletized particles.

The pellet forming step is preferably carried out on a pelletizing disc, inclined at an angle of about 45° and driven by a variable speed drive. A water spray adding to the water content imparted to the mix by the binder system will generally be employed to assist in promoting the agglomeration of the mix. A scraper facing the disc insures the proper tumbling and agitation and mixing of the water with the particles to change the mix into pellets. The "balling" action and the size of the pellets obtained is controlled by the properties of the mix, the rate at which it is fed to the disc, the angle and speed of the disc and the position at which the feed is introduced into the disc or saucer. The control of these factors may, if desired, result in the production of pellets of a highly uniform size range. Or, the conditions may be so adjusted that the size range of pellets produced, may be quite broad. The pelletized particles discharge from the disc onto a pellet chute by which they are channeled into a devolatilizer 5. Alternatively, as previously pointed out, the pellets may be sent first to a drier 15 which typically would be of the conveyor type and maintained at a temperature above about 210° F. to rid them of most of their moisture, before they are sent to the devolatilizer. This alternative depends somewhat on the design and type of devolatilizer employed and whether it is so constructed as to be able to function efficiently both as a drier or de-moisturizer and as a devolatilizer.

By following the teachings of this invention an economical and efficient process for converting raw petroleum coke, containing high percentages of non-commercial sized particles into a commercial product may be realized.

It should be emphasized that there are many critical factors in the overall process. For example, the order in which the steps of the process are carried out, such as forming the raw petroleum coke into pellets before devolatilizing, is very important. This is because the permanent bond for the pellets is developed autogeneously by fusion of the raw petroleum coke particles just prior to the conversion of the pellets into infusible coke.

Or, for example, with regard to the mixing operation, it has been found that the particle size distribution of the petroleum coke, the type of binder, the ratio of binder to coke particles, and the procedures employed in mixing the binder with the coke all have an important bearing on the ability or the extent that the mixture may be formed into pellets as well as their ability to be formed into pellets of the proper strength both before and after drying and devolatilization.

The binder employed in the processes of the present invention should be one which will provide reasonably good pellet wet strength and dry green strength and involve no serious sticking problems. Any material compatible with water which will bond and hold the materials together or provide pellets of sufficient wet strength, and which also provides pellets of adequate dry green strength for handling and devolatilizing after the water is driven off, is suitable. By this is meant materials which are emulsifiable, with water, or dispersible or soluble therein. We have found that a starchwater binder is particularly suitable in the process of the present invention. Other binder systems comprise asphalt emulsions, clay emulsions and mixtures of water with molasses or with refined or unrefined calcium ligno sulfonates. Mixtures of these binders may also be employed.

Improper proportions or ratios of the various materials in making up the pellets result in either the inability to form pellets at all or the formation of pellets lacking the proper size or the formation of pellets lacking sufficient strength. The strength of the dry pellets depends upon the ratio of bonding material, in the binder system, to carbon. The water content of the mix primarily controls the pelletizing characteristics of the mixture, such as rate of pellet development and wet pellet strength. When employing a starch based binder system, we have found that mixtures comprising by weight 100 parts of carbon particles, 25 to 35 parts water and 0.6 to 1.2 parts starch function best for the pellet forming and subsequent steps and that mixtures comprising 100 parts of carbon particles, 15 to 50 parts by water and 0.2 to 2.0 parts of starch are operative. These figures are based upon analysis of the pellets and include the water added during the pellet forming operation which approximates the amount of water employed in the mixing operation or typically about 15 parts of water in each step. The manner of mixing the starch and water with the coke mixture also has an important bearing on whether pellets are formed or whether, if pellets are produced, they have sufficient strength. Premixing the binder with the coke in a mixer prior to pelletizing results in pellet strengths much higher than those obtained where all of the binder is sprayed onto the coke during the pelletizing or pellet forming operation.

In a preferred procedure the coke is premixed with a portion of the total pellet water requirement for about 1 minute. Then starch, separately mixed with another portion of the pellet water requirement is added to the pre-wetted coke and this batch is mixed for approximately 5 more minutes. The mixture is then cycled to the pelletizer where the remaining water is used to assist in the pellet forming operation.

Other suitable mixing methods include mixing the starch with ½ of the total pellet water requirement and then adding this to the coke feed and mixing the entire batch for about 5 minutes. A third procedure is to dry blend the starch with the coke for about 1 minute and then add ½ the total water requirement of this mixture to this blend and mix the entire batch for about 5 minutes. Suitably placed valves provide for these alternatives.

As stated previously, the particle size distribution of the coke mixed with the binder is also important with respect to the subsequent pellet forming operation. We have found that when approximately 40% or more of the coke particles are finer than 100 mesh, satisfactory pellets with respect to strength, size, etc. are produced. When the coke has less than about 40% of particles finer than 100 mesh, poor agglomeration occurs. The balance of the particles employed in making the pellets may have a wide range of sizes. A typical example might show 100% —¼″ or —⅛″ as the case may be and 40–50% larger than —48 mesh.

With regard to the method employed for producing agglomerates or compacts of the desired size from these finely ground particles, we prefer, as stated previously, to form the fine particles and binder into pellets on a pelletizing disc. Size enlargement or agglomerating techniques, such as molding, extruding, briquetting or rolling may also be employed to form the pellets of this invention.

Although this invention has been illustrated by citing specific details embraced within the scope of the invention, it is to be understood that various modifications within the invention are possible, some of which have been referred to above; therefore, we do not wish to be limited except as defined by the appended claims.

We claim:

1. A process for producing a granular carbon product having a volatile matter content between about 0 and about 6 percent and a particle size above about ⅛ of an inch in diameter from a starting material comprising raw petroleum coke having a volatile matter content between about 9 and about 20 percent which comprises: (A) Separating the raw petroleum coke into groups of particles whose diameters are: (1) larger than ⅛ inch; and (2) finer than ⅛ inch; (B) milling the particles of the latter group to a fineness such that at least about 40% of the particles pass through a 100 mesh screen; (C) mixing the particles from step B with a binder system comprised of water and a bonding material compatible with water; (D) agglomerating the particles of the mixture of step C into pellets above about ⅛ inch in diameter; and (E) devolatilizing in a substantially non-oxidizing atmosphere at a temperature between about 900° F. and about 2000° F. the carbon particles larger than about ⅛ inch of separation step A and the pellets of step D until their respective volatile matter contents are between about 0 and about 6 percent.

2. A process for producing a granular carbon product having a volatile matter content between about 0 and about 6 percent and a particle size above about ⅛ of an inch in diameter from a starting material comprising raw petroleum coke having a volatile matter content between about 9 and about 20 percent which comprises: (A) Separating the raw petroleum coke into groups of particles whose diameters are: (1) larger than ⅛ inch; and (2) finer than ⅛ inch; (B) milling the particles of the latter group to a fineness such that at least about 40% of the particles pass through a 100 mesh screen; (C) mixing the particles from step B with from about 0.2% to about 2.0% by weight of starch and from about 15% to about 50% by weight of water; (D) agglomerating the particles of the mixture of step C into pellets above about ⅛ inch in diameter; and (E) devolatilizing in a substantially non-oxidizing atmosphere at a temperature between about 900° F. and about 2000° F. the carbon particles larger than about ⅛ inch of separation step A and the pellets of step D until their respective volatile matter contents are between about 0 and about 6 percent.

3. A process according to claim 1 wherein the pellets of step D are dried in a separate drier prior to being devolatilized.

4. A process for producing a granular carbon product having a volatile matter content between about 0 and about 6 percent and a particle size between about ⅛ and about 1 inch in diameter from a starting material comprising moist raw petroleum coke having a volatile matter content between about 9 and about 20 percent which comprises: (A) Removing moisture from the starting material; (B) separating the material from step A into groups of particles whose diameters are: (1) larger than 1 inch; (2) smaller than 1 inch and larger than ⅛ inch; and (3) finer than ⅛ inch; (C) reducing the diameter of the particles of group 1 to the size of the particles of groups 2 and 3 and adding these reduced in size particles to these groups; (D) separating the thus constituted groups 2 and 3 from each other; (E) milling the particles of group 3 to a fineness such that at least about 40% of the particles pass through a 100 mesh screen; (F) mixing the particles of step E with a binder system comprised of water and a bonding material compatible with water; (G) agglomerating the particles of the mixture of step F into pellets between about ⅛ and about 1 inch in diameter; and (H) devolatilizing in a substantially non-oxidizing atmosphere at a temperature between about 900° F. and about 2000° F. the carbon particles of group 2 and the pellets of step G until their respective volatile matter contents are between 0 and about 6 percent.

5. A process for producing a granular carbon product having a volatile matter content between about 0 and about 6 percent and a particle size between about ⅛ and about 1 inch in diameter from a starting material comprising moist raw petroleum coke having a volatile matter content between about 9 and about 20 percent which comprises: (A) Removing moisture from the starting material; (B) separating the material from step A into groups of particles whose diameters are: (1) larger than 1 inch; (2) smaller than 1 inch and larger than ⅛ inch; and (3) finer than ⅛ inch; (C) reducing the diameter of the particles of group 1 to the size of the particles of groups 2 and 3 and adding these reduced in size particles to these groups; (D) separating the thus constituted groups 2 and 3 from each other; (E) milling the particles of group 3 to a fineness such that at least about 40% of the particles pass through a 100 mesh screen; (F) mixing these particles with from about 0.2% to about 2.0% by weight of starch and from about 15% to about 50% by weight of water; (G) agglomerating the particles of the mixture of step F into pellets between about ⅛ and about 1 inch in diameter; and (H) devolatilizing in a substantially non-oxidizing atmosphere at a temperature between about 900° F. and about 2000° F. the carbon particles of group 2 and the pellets of step G until their respective volatile matter contents are between about 0 and about 6 percent.

6. A process according to claim 4 wherein the pellets of step G are dried in a separate drier prior to being devolatilized.

7. A process for producing a granular carbon product having a volatile matter content between about 0 and about 6 percent and a particle size above about ⅛ of an inch in diameter from a starting material comprising moist raw petroleum coke having a volatile matter content between about 9 and about 20 percent which comprises: (A) Removing moisture from the starting material; (B) crushing and milling the material from step A to a fineness such that at least about 40% of the particles pass through a 100 mesh screen and substantially all of the particles pass through an 8 mesh screen; (C) mixing these particles with a binder system comprised of water and a bonding material compatible with water; (D) agglomerating the particles of the mixture of step C into pellets above about ⅛ inch in diameter; and (E) devolatilizing in a substantially non-oxidizing atmosphere at a temperature between about 900° F. and about 2000° F. the pellets of step D until their volatile matter content is between about 0 and about 6 percent.

8. A process for producing a granular carbon product having a volatile matter content between about 0 and about 6 percent and a particle size above about ⅛ of an inch in diameter from a starting material comprising moist raw petroleum coke having a volatile matter content between about 9 and about 20 percent which comprises: (A) Removing moisture from the starting material; (B) crushing and milling the material from step A to a fineness such that at least about 40% of the particles pass through a 100 mesh screen and substantially all of the particles pass through an 8 mesh screen; (C) mixing these particles with from about 0.2% to about 2.0% by weight of starch and from about 15% to about 50% by weight of water; (D) agglomerating the particles of the mixture of step C into pellets above about ⅛ inch in diameter; and (E) devolatilizing in a substantially non-oxidizing atmosphere at a temperature between about 900° F. and about 2000° F. the pellets of step D until their volatile matter content is between about 0 and about 6 percent.

9. A process according to claim 7 wherein the pellets of step D are dried in a separate drier prior to being devolatilized.

10. A process for producing a granular carbon product having a volatile matter content between about 0 and about 6 percent and a particle size above about ⅛ of an inch in diameter from a starting material comprising raw petroleum coke having a volatile matter content between about 9 and about 20 percent which comprises: (A) Crushing and milling the particles to a fineness such that at least about 40% of the particles pass through a 100 mesh screen and substantially all of the particles pass through an 8 mesh screen; (B) mixing these particles with a binder system comprised of water and a bonding material compatible with water; (C) agglomerating the particles of the mixture of step B into pellets above about ⅛ inch in diameter; and (D) devolatilizing in a substantially non-oxidizing atmosphere at a temperature between about 900° F. and about 2000° F. the pellets of step C until their volatile matter content is between about 0 and about 6 percent.

11. A process for producing a granular carbon product having a volatile matter content between about 0 and about 6 percent and a particle size above about ⅛ of an inch in diameter from a starting material comprising raw petroleum coke having a volatile matter content between about 9 and about 20 percent and a particle size such that at least about 40% of the particles pass through a 100 mesh screen, and substantially all of the particles pass through an 8 mesh screen, which comprises: (A) Mixing these particles with a binder system comprised of water and a bonding material compatible with water; (B) agglomerating the particles of the mixture of step A into pellets above about 1/8 inch in diameter; and (C) devolatilizing in a substantially non-oxidizing atmosphere at a temperature between about 900° F. and about 2000° F. the pellets of step B until their volatile matter content is between about 0 and about 6 percent.

12. A process for producing a granular carbon product having a volatile matter content between about 0 and about 6 percent and a particle size above about 1/8 of an inch in diameter from a starting material comprising raw petroleum coke having a volatile matter content between about 9 and about 20 percent which comprises: (A) Separating the raw petroleum coke into groups of particles whose diameters are: (1) larger than 1/8 inch; and (2) finer than 1/8 inch; (B) milling the particles of the latter group to a fineness such that at least about 40% of the particles pass through a 100 mesh screen; (C) mixing the particles from step B with a binder system comprised of water and a bonding material compatible with water; (D) agglomerating the particles of the mixture of step C into pellets above about 1/8 inch in diameter; and (E) devolatilizing at a temperature between about 900° F. and about 2000° F. the carbon particles larger than about 1/8 inch of separation step A and the pellets of step D until their respective volatile matter contents are between about 0 and about 6 percent, the devolatilization of the pellets being carried out in a substantially non-oxidizing atmosphere.

13. A process for producing a granular carbon product having a volatile matter content between about 0 and about 6 percent and a particle size above about 1/8 of an inch in diameter from a starting material comprising raw petroleum coke having a volatile matter content between about 9 and about 20 percent which comprises: (A) Crushing and milling the particles to a fineness such that at least about 40% of the particles pass through a 100 mesh screen and substantially all of the particles pass through an 8 mesh screen and mixing these particles with from about 0.2% to about 2.0% by weight of starch and from about 15% to about 50% by weight of water; (B) agglomerating the particles of the mixture of step A into pellets above about 1/8 inch in diameter; and (C) devolatilizing in a substantially non-oxidizing atmosphere at a temperature between about 900° F. and about 2000° F. the pellets of step B until their volatile matter content is between about 0 and about 6 percent.

14. A process according to claim 13 wherein the pellets of step B are dried in a separate drier prior to being devolatilized.

References Cited in the file of this patent
UNITED STATES PATENTS

| | | |
|---|---|---|
| 1,276,429 | Smith | Aug. 20, 1918 |
| 1,746,767 | Debauche | Feb. 11, 1930 |
| 2,776,935 | Jahnig et al. | Jan. 8, 1957 |

FOREIGN PATENTS

| | | |
|---|---|---|
| 744,432 | Great Britain | Feb. 8, 1956 |

OTHER REFERENCES

Petroleum Coke, An Economic Survey of Its Production and Uses, by E. B. Swanson, Department of Commerce, Bureau of Mines, Economic Paper 9, 1930.